Jan. 21, 1941.                G. SMILEY                2,229,479
                           COMPUTING DEVICE
                         Filed Feb. 19, 1938            2 Sheets-Sheet 1

GILBERT SMILEY   INVENTOR.

BY  *Ezekiel Wolf*

ATTORNEY.

Jan. 21, 1941.                G. SMILEY                 2,229,479
                          COMPUTING DEVICE
                        Filed Feb. 19, 1938        2 Sheets-Sheet 2

GILBERT SMILEY  INVENTOR.

BY Ezekiel Wolf

ATTORNEY.

Patented Jan. 21, 1941

2,229,479

UNITED STATES PATENT OFFICE 2,229,479

COMPUTING DEVICE

Gilbert Smiley, Hingham, Mass.

Application February 19, 1938, Serial No. 191,409

5 Claims. (Cl. 235—84)

The present invention relates to a means and method of accurately determining lens adjustment for cameras and the like to obtain maximum allowable depth of focus under general and special operating conditions.

In the formation of a latent photographic image upon a light sensitive medium by the action of a properly corrected lens, only that portion of the subject upon which the lens is accurately focused will produce an image free from blur, sharply and clearly defined. Objects either before or behind the plane of focus will exhibit progressive blurring in the image; the degree of blur or dispersion (lack of "sharpness") increasing as the distance from the plane of "accurate focus" increases. Since a certain degree of blur can be tolerated, and since blurring of images of objects but slightly before or behind the plane of sharp focus is, in turn, very slight, there is a certain region related to the plane of accurate focus in which images of objects will be reproduced with satisfactory (though not absolute) sharpness. This region is described as the focal depth, and as will be demonstrated, its limits are determined by the maximum permissible amount of blurring, the focal length of the lens, the relative aperture of the lens, and the distance from the optical centre of the lens to the plane of accurate focus, all of which factors are defined and illustrated in the ensuing text and accompanying figures.

With a given lens focused for a given distance, the depth of focus may be increased by the action of "stopping down" the lens. This action, which consists of utilizing only the more central portion of the lens area, decreases the amount of light passed in a unit of time through the lens opening, requiring a longer exposure for a given subject of fixed illumination than would be required were a larger portion of the lens area to be used. Since short exposures are normally desirable due to motion of the subject, the camera or both, and since the practice of stopping down the lens to secure a greater depth of focus introduces an increase in required exposure time, it is obvious that it is desirable to know the exact amount of stopping down required for a given subject, in order that the exposure may be kept at a minimum for the required depth of focus. However many photographic subjects gain in artistic appeal through the deliberate application of depth of focus considerations to the problem in hand. Particularly on "candid" (imposed) portraiture, it is often impossible to select an artistic or desirable background. Through the application of depth of focus principles the subject may be clearly portrayed, while the background is sufficiently blurred to obscure distracting and unwanted details. Furthermore, the practice of subordinating extraneous details by blurring, while the subject is sharply portrayed often introduces an apparent third, or depth, dimension to an otherwise two dimensional picture; often a valuable ability. In all these instances, and in others, a rapid, simple and sufficiently accurate means of securing the necessary information as to the proper "stop" required for a given depth of focus is of great value to the photographer.

To this end certain existing cameras are equipped with depth of focus tables in which the limits of the depth of focus are tabulated, versus the distance to the plane of accurate focus and the aperture "stops" of the lens. Other cameras are supplied with depth of focus scales coincident with the focusing means which automatically show the limits of focal depth for various stops at all settings within the range of the camera. In others, a small computing device is included, not connected with the focusing means, but to be used in conjunction with such means. All these devices however, have a common factor—they are applicable only to the lenses for which they are computed (generally the lens supplied with the camera on which they are mounted, or with which they are supplied).

My present invention relates to a depth of focussing computing device which may readily be used with any lens suitable for focusing, and which may be used by photographers having several cameras and lenses, the device being equally applicable to all lenses regardless of focal length, compensation for differences of focal length being made by means of a single simple adjustment. Furthermore my invention may readily and simply be used with such special purpose lenses as fall into "wide-angle" and "telephoto" classifications as opposed to normal lenses used in general photography.

My invention will be more readily understood from the description in the specification below taken in connection with the drawings in which—

Figure 1:
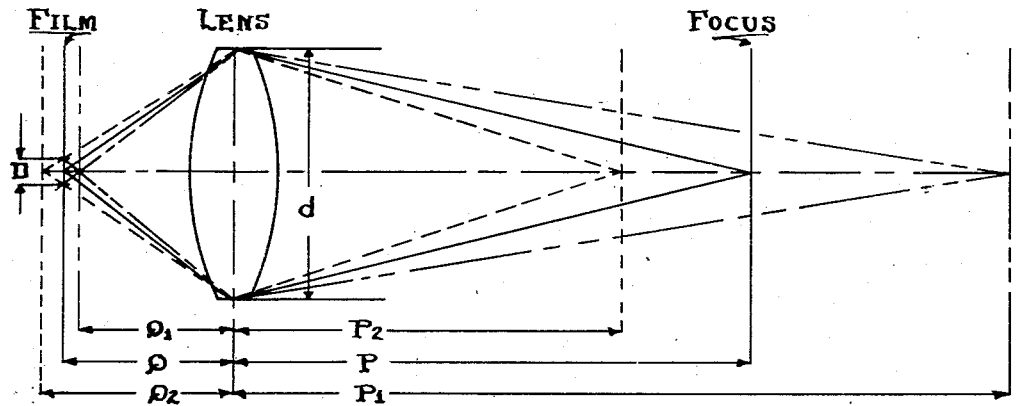
Figure 1 illustrates schematically the principles of the invention as applied to a simple double convex object lens.

Figure 1 illustrates a photographic lens (shown as a simple double convex objective, which, it should be understood, is purely a simplified construction, the complex structure of a highly corrected lens being too confusing for the purpose of analysis), sharply focused on an object plane at distance P from the lens center, producing an image on the image plane (film or plate) at distance Q from the lens center. It will be observed that the bundles of light rays from points in front and rear planes (at distances $P_2$ and $P_1$ from lens center, respectively) converge to points in two other image planes (at distances $Q_2$ and $Q_1$ from lens center, respectively), intersecting the film plane as circles of diameter D. These circles are known as circles of confusion, and it has been arbitrarily determined that a circle of confusion one-one hundredth of an inch in diameter is entirely permissible in a normal eight inch by ten inch photographic print when viewed from a normal viewing distance (approximately three feet). Since many cameras produce a negative smaller in dimension than 8'' by 10'', it is obvious that the process of enlargement must be employed to secure a print of this size. Such enlargement imposes smaller limits on the permissible circle of confusion, which must be smaller in proportion to the degree of enlargement required.

All lenses have a constant factor known as focal length, for which the symbol F will hereafter be used. This factor is the distance between lens center and image plane with the lens focused on infinity. It is furthermore a common arbitrary practice to have the focal length of the lens roughly equal to the diagonal of the negative covered by the lens, when the lens is to be used for general photography. It thus becomes apparent that negative dimensions are related to lens focal length and, since the diameter of the permissible circle of confusion depends upon required enlargement (i. e. negative size) it is possible to relate the diameter of the circle of confusion to the focal length of the normal lens of the camera. The term "normal" is here used to exclude special purpose lenses falling into "wide-angle" and "telephoto" classifications.

Based on the reasonable assumption that the average negative from a lens of two inch focal length will require a ten diameter enlargement to produce an eight by ten inch print with a one one-hundredth inch circle of confusion in that portion of the subject that is to be sharply portrayed, it becomes possible to derive the relationship between the maximum permissible circle of confusion diameter and the focal length of the normal lens. This relationship is a ratio, the numerical value of which is expressed by the factor A. From the foregoing:

1. $$A=\frac{D}{F}=.01 \times .1 \times .5 = 0.0005$$

It should be noted in the above formula that where an enlargement is to be made the allowable diameter of the circle of confusion on the original negative must be divided by the enlargement power.

While the numerical value of 0.0005 is assigned to A in computing the scales of my invention, it should not be construed that my invention does not contemplate the use of other values, nor is it intended to limit the scope of my invention thereby. The value assigned is merely one of many possible values, selected as being highly representative of average conditions and well suited to general photographic work.

Another factor entering into the depth of focus computations is the relative aperture at which the lens is to be operated. This is defined as the ratio of the focal length to the effective free diameter of the lens. For this ratio the symbol $f$, is used. Relative aperture may be expressed as follows:

2. $$f=\frac{F}{d}$$

With the foregoing factors in mind it is possible to proceed to the equation expressing $f$ in terms of F, $P_1$, $P_2$, A. It can be demonstrated from the fundamental equation $$\frac{1}{P}+\frac{1}{Q}=\frac{1}{F}$$

that:

3. $$f=\frac{F}{A}\frac{P_1-P_2}{2P_1P_2-F(P_1+P_2)}$$

which is an exact relationship, fulfilling all requirements.

This derivation is set forth below.

Let $\theta$, $\theta_1$, and $\theta_2$ respectively, be the angle subtended by the center line of the lens and the rays of light reflected from the greatest effective free diameter $d$, corresponding to the points P, $P_1$ and $P_2$, and intersecting the center line at the distances Q, $Q_1$ and $Q_2$ respectively from the lens center. The plane embracing the point Q as in Figure 1 is the plane of the film. Then from Figure 1 $D=2R$ and $d=2r$ and Equation 2

$$f=\frac{F}{2r} \tan\theta_1=\frac{r}{Q_1}=\frac{F}{2fQ_1} \quad \tan\theta_2=\frac{r}{Q_2}=\frac{F}{2fQ_2}$$

and $$R=[Q-Q_1]\tan\theta_1 \quad R=[Q_2-Q]\tan\theta_2$$

(a) $$R=\frac{F}{2f}\left[\frac{Q}{Q_1}-1\right] \quad R=\frac{F}{2f}\left[1-\frac{Q}{Q_2}\right]$$

and it follows (b) $$\frac{Q}{Q_1}-1=1-\frac{Q}{Q_2}$$

and $$Q=\frac{2Q_1Q_2}{Q_1+Q_2}$$

Substituting in (a)

(c) $$R=\frac{F}{2f}\left[\frac{2Q_1Q_2}{Q_1(Q_1+Q_2)}-1\right]=\frac{F}{2f}\left[\frac{Q_1Q_2-Q_1^2}{Q_1Q_2+Q_1^2}\right]=$$

$$\frac{F}{2f}\left[\frac{Q_2-Q_1}{Q_2+Q_1}\right]$$

But from the fundamental equation (e) $$Q_1=\frac{P_1F}{P_1-F}$$

and $$Q_2=\frac{P_2F}{P_2-F}$$

also $$P=\frac{QF}{Q-F}$$

Substituting in (c)

(f) $$R=\frac{F}{2f}\left[\frac{\frac{P_2F}{P_2-F}-\frac{P_1F}{P_1-F}}{\frac{P_2F}{P_2-F}+\frac{P_1F}{P_1-F}}\right]=$$

$$\frac{P_2P_1F^2-P_2F^2-P_2P_1F+P_1F^2}{P_2P_1F-P_2F^2+P_2P_1F-P_1F^2}\times\frac{F}{2f}$$

(g) $$R=\frac{F}{2f}\times\frac{F^2(P_1-P_2)}{F[2P_1P_2-F(P_1+P_2)]}$$

From (1)

(3) $$R = \frac{AF}{2} = \frac{F^2(P_1-P_2)}{2P_1P_2 - F(P_1+P_2)} \times \frac{1}{2f}$$

or $$f = \frac{F}{A} \cdot \frac{P_1 - P_2}{2P_1P_2 - F(P_1+P_2)}$$

Equation 3, however, may be closely approximated by—

4. $$f = \frac{F}{A} \frac{P_1 - P_2}{2P_1P_2}$$

in which the term, $$-F(P_1+P_2)$$

is neglected.

The error resulting in the diameter of the ultimate circle of confusion by this approximation is entirely negligible at normal working distances. The actual error is expressed by:

5. $$\text{Error} = \frac{100\,F}{P-F}\%$$

With, for example a lens of $F=3''$, working at a focus of $P=4'=48''$, the error is but 6.67%, surely a permissible error at this short working distance. Since the error decreases rapidly with increased working distances, the usefulness of the device is not impaired by the slight error inherent in its generalized design.

Figure 2:
Figure 2 is a sectional view of my computing device.
Figure 3:
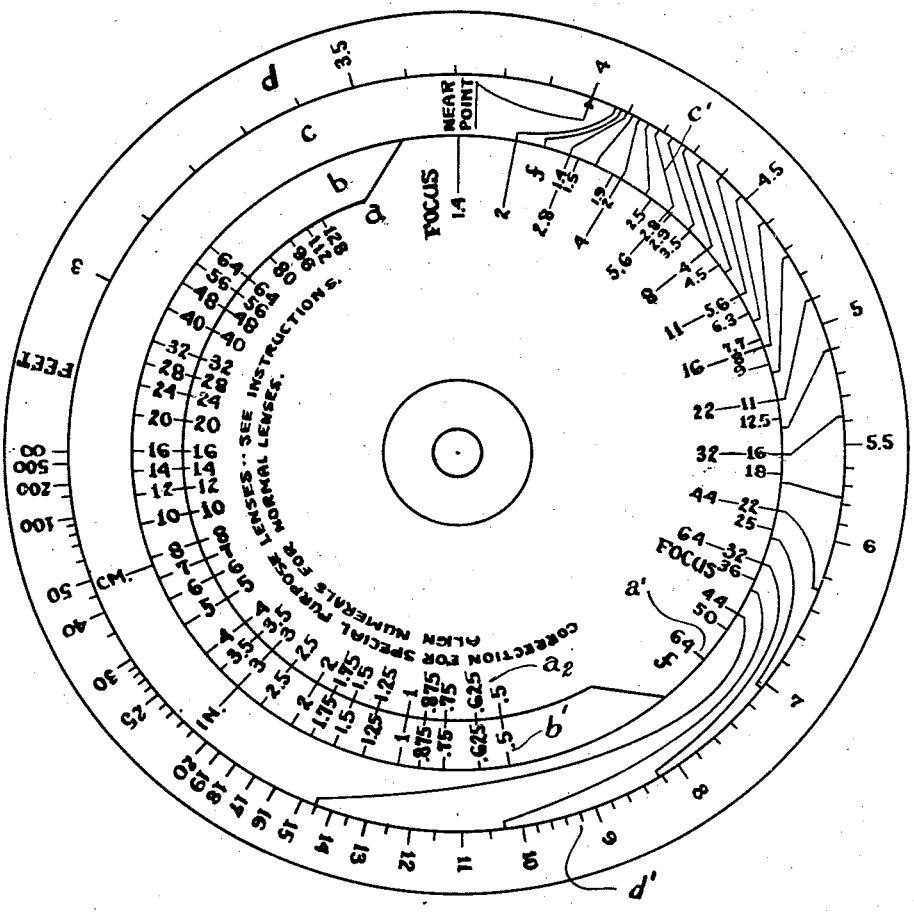
Figure 3 is a plan view looking downward from the top of Figure 2.

Equation 4 may be rewritten:

6. $$\frac{1}{P_2} - \frac{1}{P_1} = \frac{f2A}{F}$$

from which are derived the distance scale, aperture lines, stop and focal length scales of my invention as shown in Figure 2 and Figure 3. Any suitable mathematical means may be established for computing the scales above from Equation 6, and for this purpose it is most useful to convert this equation into proper logarithmic functions for the computation of the values from which the scales are calibrated.

The distance scale is shown on the outer disc $d$ in Figure 3. The scale $d'$ represents reciprocals of distances in logarithmic values and the scale $a'$ represents focal distances also calibrated in logarithmic functions. The disc $c$ has a plurality of lines $c'$ thereon for correlating the scale $d'$ on the disc $d$ with the scale $a'$ on the disc $a$. As indicated in Figure 3 by the special legends thereon, the scale $a_2$ at the left of disc $a$ is the correction scale for special purpose lenses, while the scale $b'$ on the disc $b$ at the left and entitled F opposite the correction scale is the focal length scale of the lens. The $c'$ scale is provided with a setting mark which is located either for centimeter or inch use as denoted by cm. and in. respectively. Both scales F designated $b'$ and the special purpose lens scale $a_2$ are focal length scales. At the right of the disc $a$, this disc overlaps the disc $b$ so that its edge lines coincide. This portion of the disc $a$ is also provided with focal distance calibration and with a corresponding relative aperture, thereby of course setting relationship between the two elements. The special purpose scale is explained in the relationship just below. The intermediate disc $c$ carries also the near point setting and there is likewise determined through the lines across this disc the far point setting as well.

It can also be demonstrated from the fundamental equation that—

7. $$P = \frac{2P_1P_2}{P_1+P_2}$$

This will readily be seen from the similar relation derived above, namely $$Q = \frac{2Q_1Q_2}{Q_1+Q_2}$$

since Q and P are conjugately related functions as illustrated from the derivation $e$ from the fundamental equation above.

If, on the distance scale a point be located spaced midway between $P_1$ and $P_2$ (represented of course by their reciprocal values from Equation 6) that point will be found to locate P in accordance with Equation 7. This follows directly from Equation 7 since from this equation $$\frac{1}{P} = \frac{1}{2}\left(\frac{1}{P_1} + \frac{1}{P_2}\right)$$

From this may be derived the focus scale of my invention, Figure 2 and Figure 3.

Because special purpose (wide-angle and telephoto) lenses have focal lengths unequal to the negative diagonal, their focal lengths cannot be used as a direct indication of the required degree of enlargement without compensation. It can be shown in accordance with the previous equations relating to the circle of confusion that a focal length may be computed for setting purposes which will fulfill the requirements and yield a correct circle of confusion in accordance with the following equation:

8. $$F = \frac{Fs}{Fn}Fs$$

where F is the focal length to be used in setting the computer. Fs is the focal length of the special purpose lens. Fn is the focal length of the normal lens for the camera. It may be shown from the above Equation 8 that 9. $$R = \frac{Z}{f}$$

where $$Z = \frac{P_1F^2 - PF^2}{2P_1(P-F)} = \frac{PF^2 - P_2F^2}{2P_2(P-F)}$$

which is to say that the radius of the circle of confusion varies inversely as the aperture number. Since the special purpose lenses may be related to a normal lens for the camera in question by considering the ratio of the focal length of the special purpose lens (Fs) to the focal length of the normal lens (Fn) the stop correction equation may be derived first 10. $$F_n = \frac{Z}{R_n}$$

from the above in which the subscript $n$ denotes normal lens.

11. $$F_s = \frac{Z}{R_s}$$

from 10 where subscript $s$ denotes the special lens.

12. $$\frac{R_s}{R_n} = \frac{F_n}{F_s}$$

which denotes that the permissible circle of confusion for special purpose lens must vary inversely from the standard as the focal length of such varies from the standard or $$\frac{f_s}{f_n} = \frac{R_s}{R_n} = \frac{F_n}{F_s}$$

Since the disc $c$ of Figures 2 and 3 already includes means for changing $f$ values it is merely necessary to set these in a special manner for special purpose lenses. The equation for determining this setting is $$F_a = F_s \times \frac{F_a}{F_n}$$

where $F_a$ equals the focal length used in setting $c$ to $b$ and $F_s$ equals focal length of the special lens and $F_n$ equals focal length of the normal lens. From Equation 3 are derived the special purpose lens correction scales of my invention, Figure 2 and Figure 3. The use of the computer may best be illustrated by specific problems illustrated by the settings shown in Figure 3.

*Case 1.*—Known: Normal lens of $F=3''=7.62$ centimeters (cm.)

Near point $(P_2) = 4'$
Far point $(P_1) = 5.4'$

Required: Relative aperture $(f)$ and distance on which to focus (P).

Procedure: Line up scales $a_2$ and $b'$ so that the numbers coincide because a normal lens is being employed. Set the $b'$ (F) scale to 3 inches. Set the "near point" arrow to 4 feet on the distance scale $d'$. Follow the aperture line opposite 5.4 feet on the distance scale back to the $a'$ $(f)$ scale and read the $f$ value ($f$ 16). Follow the aperture line from 16 on the focus $a'$ scale to the distance scale and read the focus value (4.6 feet).

*Case 2.*—Known: Normal lens of $F=3''$ as above.

Focused on 4.4 feet
Set at aperture $f$ 11.

Required: Near point $(P_2)$ and far point $(P_1)$.

Procedure: Line up scales $a_2$ and $b'$ as in Case 1, also set the F scale to 3''. Set the aperture line from 11 on the focus scale to 4.4 feet on the distance scale. Read the near point on the distance scale opposite the near point arrow (4 feet). Read the far point opposite the aperture line from 11 on the $a'$ $(f)$ scale (4.87 feet). In the use of special purpose lenses, the focal length of the special purpose lens on the $a_2$ scale is set to the focal length of the normal lens in the same units (inches or centimeters) on the $b'$ (F) scale, and the focal length of the special purpose lens is then used in setting the $b'$ (F) scale to the arrow on the $c'$ scale.

For the purpose of deriving the simplified form of equation for computing the various scales, a complete mathematical analysis will be given.

The fundamental equation is expressed as

1. $$\frac{1}{P}+\frac{1}{Q}=\frac{1}{F}$$

2. $$QF + PF = PQ$$

3. $$Q = \frac{PF}{P-F}$$

4. $$P = \frac{QF}{Q-F}$$

These latter two equations illustrate the conjugate nature of the terms P and Q.

Continuing with the analysis of the arrangement of Figure 1, it is evident that there is a mathematical relationship between the various factors that may be used to determine the radius, R, of the circle of confusion produced by a point in the rear plane ($P_1$ from lens center) upon the film when the camera is focused upon a plane at a distance, P, from the lens center. It is evident from the figure that the most oblique rays (those refracted from the outermost portion of the lens) are the most convergent and divergent, and it is these that form the perimeter of the circle of confusion. They form an angle, $\theta_1$, with the axis of the lens, the trigonometric tangent of which may be expressed as $$\frac{r}{Q_1}$$

thus;

6. $$\tan \theta_1 = \frac{r}{Q_1}$$

where $r$ is the radius of the effective lens aperture and $Q_1$ is the distance from lens center to plane of convergence for rays from a point in the rearward plane (P, from lens center). Furthermore it is possible to substitute for the following;

7. $$r = \frac{F}{2f}$$

from the equation

8. $$f = \frac{F}{d} = \frac{F}{2r}$$

9. $$\tan \theta_1 = \frac{F}{2fQ_1}$$

Since, at the intersection of two straight lines, opposite angles are equal, and since, also, tangents of equal angles are equal, it is possible to derive an equation for R, thus:

10. $$R = (Q - Q_1) \tan \theta_1$$

which, from 3 and 9 becomes

11. $$R = \left(\frac{PF}{P-F} - \frac{P_1F}{P_1-F}\right)\frac{F}{2f}\left(\frac{P_1-F}{P_1F}\right) =$$
$$\frac{PF(P_1-F) - P_1F(P-F)}{(P-F)(P_1-F)}\left[\frac{P_1-F}{2fP_1}\right] =$$
$$\frac{PP_1F - PF^2 - PP_1F + P_1F^2}{2fP_1(P-F)} = \frac{P_1F^2 - PF^2}{2fP_1(P-F)}$$

If now we wish to ascertain the value of $P_1$, the equation may be further manipulated:

12. $$P_1[F^2 - 2fR(P-F)] = PF^2$$

from which

13. $$P_1 = \frac{PF^2}{F^2 - 2fR(P-F)}$$

A similar process may be applied to the determination of $P_2$, the distance to a forward plane, as illustrated in Figure 4. Thus:

14. $$\tan \theta_2 = \frac{r}{Q_2}$$

15. $$\tan \theta_2 = \frac{F}{2fQ_2}$$

from 14 and 7.

16. $$R = (Q_2 - Q) \tan \theta_2$$

which from 3 and 15 becomes

17. $$R = \left(\frac{P_2F}{P_2-F} - \frac{PF}{P-F}\right)\frac{F}{2f}\left(\frac{P_2-F}{P_2F}\right) =$$
$$\frac{P_2F(P-F) - PF(P_2-F)}{(P_2-F)(P-F)}\left[\frac{P_2-F}{2fP_2}\right] =$$
$$\frac{PP_2F - P_2F^2 - PP_2F + PF^2}{2fP_2(P-F)} = \frac{PF^2 - P_2F^2}{2fP_2(P-F)}$$

and

18. $$P_2[F^2 + 2fR(P-F)] = PF^2$$

19. $$P_2 = \frac{PF^2}{F^2 + 2fR(P-F)}$$

Equations 13 and 19 give the rearward and forward limits of focal depth ($P_1$ and $P_2$ respectively) in terms of focal setting, P, focal length, F, relative aperture, $f$, and permissible radius of circle of confusion, R. These equations, however, are not suited to rapid computation, and my invention constitutes a means of so relating these variables as to rapidly determine missing factors in the following instances:

| Known | To determine |
|---|---|
| F, P, f | $P_1$, $P_2$ |
| F, $P_1$, $P_2$ | P, f |
| $P_1$, $P_2$, f | P, F | whereas the conventional depth of focus device only allows the following

| Known | To determine |
|---|---|
| P, f | $P_1$, $P_2$ |
| $P_1$, $P_2$ | P, f | and operates for but one value of F.

To design such a device further mathematical operations are necessary. They are:

20. $\quad \text{Let } \dfrac{P}{F} = X$

21. $\quad \text{Let } \dfrac{P_1}{F} = X_1$

22. $\quad \text{Let } \dfrac{P_2}{F} = X_2$

23. $\quad \text{Let } \dfrac{Q}{F} = Y$

24. $\quad \text{Let } \dfrac{Q_1}{F} = Y_1$

25. $\quad \text{Let } \dfrac{Q_2}{F} = Y_2$

26. $\quad \text{Let } \dfrac{R}{F} = A$

Equation 26 introduces the variable factor which is brought about by the practice of photographic enlargement. Thus, if an image of 0.8 inch by 1.0 inch is to be enlarged some ten diameters to produce a photographic print 8 inches by 10 inches, it is obvious that the circle of confusion on the small image must be one tenth the diameter of the permissible circle of confusion on the enlarged print. Since the focal length, F, of a general purpose lens varies approximately as the negative dimensions, the ratio term, A, accurately expresses the varying tolerance in image circle of confusion dimensions. Based on a 20 inch focal length lens for a direct 8 inch by 10 inch negative (requiring no enlargement) and a 1/100th inch diameter circle of confusion, the factor A, for general purpose lenses becomes 27. $\quad A = \dfrac{R}{F} = \dfrac{.01/2}{20} = .00025$ which is the factor used in computing the actual scales of my invention. This factor, however, may be changed without altering the essential nature of the invention.

To continue, it is necessary to get Equations 13 and 19 into such form that they may be used as scales on a computing means. The derivation follows:

13. $\quad P_1 = \dfrac{PF^2}{F^2 - 2fR(P-F)}$

28. $\quad P_1 = \dfrac{XFF^2}{F^2 - 2AfFF(X-1)}$ from 13, 20, 26

$\quad = \dfrac{XF}{1 - 2Af(X-1)}$

4. $\quad P = \dfrac{QF}{Q-F}$

29. $\quad P = \dfrac{YF^2}{YF - F} = F\dfrac{Y}{Y-1}$ from 23

20. $\quad \dfrac{P}{F} = X$

30. $\quad X = \dfrac{Y}{Y-1}$ from 20, 29

31. $\quad P_1 = \dfrac{\dfrac{Y}{Y-1}F}{1 - 2Af\left(\dfrac{Y}{Y-1} - 1\right)}$ from 28, 30

$\quad = \dfrac{YF}{Y-1-2Af(Y-Y+1)} = \dfrac{YF}{Y-1-2Af}$

24. $\quad Y_1 = \dfrac{Q_1}{F}$

32. $\quad Y_1 = \dfrac{P_1}{P_1 - F}$ from 3, 24

33. $\quad Y_1 = \dfrac{\dfrac{YF}{Y-1-2Af}}{\dfrac{YF}{Y-1-2Af} - F}$ from 31, 32

$\quad = \dfrac{YF}{YF - YF + F + 2AfF} = \dfrac{Y}{1 + 2Af}$

19. $\quad P_2 = \dfrac{PF^2}{F^2 + 2fR(P-F)}$

34. $\quad P_2 = \dfrac{XFF^2}{F^2 + 2AfFF(X-1)}$ from 19, 20, 26

$\quad = \dfrac{XF}{1 + 2Af(X-1)}$

35. $\quad P_2 = \dfrac{\dfrac{YF}{Y-1}}{1 + 2Af\left(\dfrac{Y}{Y-1} - 1\right)}$ from 30, 34

$\quad = \dfrac{YF}{Y-1+2Af(Y-Y+1)} = \dfrac{YF}{Y-1+2Af}$

25. $\quad Y_2 = \dfrac{Q_2}{F}$

36. $\quad Y_2 = \dfrac{P_2}{P_2 - F}$ from 3, 25

37. $\quad Y_2 = \dfrac{\dfrac{YF}{Y-1+2Af}}{\dfrac{YF}{Y-1+2Af} - F}$ from 35, 36

$\quad = \dfrac{YF}{YF - YF + F - 2AfF} = \dfrac{Y}{1 - 2Af}$

Equations 33 and 37 are simplified forms of Equations 13 and 19, which permit the design of suitable scales as the variable factors have been brought into proper relation for logarithmic manipulation. The simplification is mathematically exact throughout.

Logarithmic practice shows that, in division, the logarithm of the result is equal to the difference of the logarithms of the two numbers involved. Thus:

38. $\ln\dfrac{Y}{1+2Af}=\ln Y-\ln(1+2Af)$

39. $\ln\dfrac{Y}{1-2Af}=\ln Y-\ln(1-2Af)$ where "ln" is the accepted abbreviation for the natural or Naperian logarithm.

In the computation of natural logarithms, the expansion series—

40. $\ln Y=\dfrac{Y-1}{Y}+\dfrac{1}{2}\left(\dfrac{Y-1}{Y}\right)^2+\dfrac{1}{3}\left(\dfrac{Y-1}{Y}\right)^3+\cdots$ may be used. From 30. $X=\dfrac{Y}{Y-1}$ the Equation 40 may be rewritten 41. $\ln Y=\dfrac{1}{X}+\dfrac{1}{2}\cdot\dfrac{1}{X^2}+\dfrac{1}{3}\cdot\dfrac{1}{X^3}+\cdots$ and, for all fairly large values of $X$, it may be demonstrated that the equation 42. $\ln Y=\dfrac{1}{X}$ closely approximates the actual value, as the succeeding terms in Equation 41 do not materially affect the result for the larger values of $X$, such as are encountered in general (as opposed to specialized) photography.

Since

20. $\dfrac{P}{F}=X$ it is evident that

43. $\ln Y=\dfrac{F}{P}$ from 20, 42 approximately, as detailed under 42 above.

Assuming, for example, a lens of $F=1$ foot, a scale may readily be laid out as in Figure 3, proportionate to $\dfrac{F}{P}=\ln Y$ Following is a condensed tabulation from which such a scale may be prepared, in which $F=1$ foot:

| Feet | F/P | 20F/P=scale in inches (used as example in Figure 3). The factor, 20, is arbitrarily selected to yield a convenient scale length. |
|---|---|---|
| Infinite | .0000 | .000 |
| 500 | .0020 | .040 |
| 200 | .0050 | .100 |
| 100 | .0100 | .200 |
| 70 | .0143 | .286 |
| 50 | .0200 | .400 |
| 30 | .0333 | .667 |
| 20 | .0500 | 1.000 |
| 15 | .0667 | 1.333 |
| 12 | .0833 | 1.667 |
| 10 | .1000 | 2.000 |
| 7 | .1429 | 2.857 |
| 5 | .2000 | 4.000 |
| 4 | .2500 | 5.000 |
| 3 | .3333 | 6.667 |

The distance scale, Equation 43, and the table accompanying Equation 43 must now be operated upon by another logarithmic scale proportional to $\ln(1\pm 2Af)$ as in Equations 38 and 39. A warrantable approximation, 44. $\ln(1+S)=S$ may be used here, as it refers to "S" as a small quantity, thus:

45. $\ln(1+2Af)=2Af$ when $2Af$ is small as contrasted with unity (1). Also, the logarithmic distance of $(1-2Af)$ is the same (i. e.: $2Af$) though in the opposite direction. Thus the logarithmic distance from $Y_1$ to $Y_2$ is $2(2Af)$ or $4Af$. Tabulated, this becomes

| f | 4Af | 20×4Af=scale in inches |
|---|---|---|
| 1 | .0010 | .02 |
| 1.4 | .0014 | .028 |
| 2 | .0020 | .040 |
| 2.8 | .0028 | .057 |
| 4 | .0040 | .080 |
| 5.6 | .0057 | .113 |
| 8 | .0080 | .160 |
| 11 | .0113 | .223 |
| 16 | .0160 | .320 |
| 22 | .0220 | .452 |
| 32 | .0320 | .640 |
| 44 | .0453 | .905 |
| 64 | .0640 | 1.280 |
| 88 | .0905 | 1.810 |
| 128 | .1280 | 2.560 |

The slight disparity between the columns lies in the fact that camera stop values are approximately proportional to $\sqrt{2}$ steps, while the computations are exactly in such steps. The error introduced by the Equation 45 is so slight as to be negligible in the tabulation.

The sectional drawing in Figure 2 serves to illustrate one form of construction possible in the actual manufacture of my invention. The three top scale carrying members are quite firmly gripped by eyelet $f$ which serves to create sufficient friction to maintain the focal setting and special purpose lens setting once such setting has been made. Eyelet $e$ fastens less tightly through eyelet $f$ and the lower scale carrying member so that the distance scale may be rotated more freely, facilitating use.

While circular scales are illustrated in Figure 2 nothing in my invention precludes its application disclosed in Figure 2, should not be construed as limiting my invention as to mechanical form. Such improvements as the elimination of parallax by placing scales in the same plane, etc., are also contemplated.

Having now described my invention, I claim:

1. A depth of focus computing device for determining proper relationships between depth of focus, relative aperture openings and lens focal lengths, comprising a plurality of discs having means mounting them concentrically and together, said discs consisting of one disc having at one side thereof a scale of logarithmic calibrations corresponding to relative aperture openings and continuing at the other side thereof in a similar scale of lens focal lengths, a second disc having a scale of logarithmic calibrations of object distances and a third disc having a plurality of lines correlating said first and last scales including a near point setting for the object distance scale and a zero point setting for the lens focal length scale whereby the near point and far point, the depth focus, the relative aperture opening and the mean focus may be determined.

2. A depth of focus computing device for determining proper relationships between depth of focus, relative aperture openings and lens focal lengths, comprising separate means mounting a plurality of parallel scales, means for permitting moving of said scales parallel to each other, one of said separate means having a scale of logarithmic calibrations of object distances, the other of said means having logarithmic calibrations of relative aperture openings, and the same scale, repeated a definitely spaced position therefrom, as a scale of lens focal lengths and means mounting a third scale between the others having lines correlating the object distances with the aperture openings and indices marking the settings for the lens focal lengths and object distances.

3. A depth of focus computing device as set forth in claim 2 having means mounting an additional similar lens focal length scale, movable parallel with respect to the first lens focal length scale and interposed between the first lens focal length scale and the index for marking the setting for the lens focal lengths.

4. A depth of focus computing device as set forth in claim 2 having the said scale of logarithmic calibrations of relative aperture openings also marked with focus lengths.

5. A depth of focus computing device as set forth in claim 2 having the said scale of logarithmic calibrations of relative aperture openings marked in corresponding focal lengths.

GILBERT SMILEY.